Figure 1:
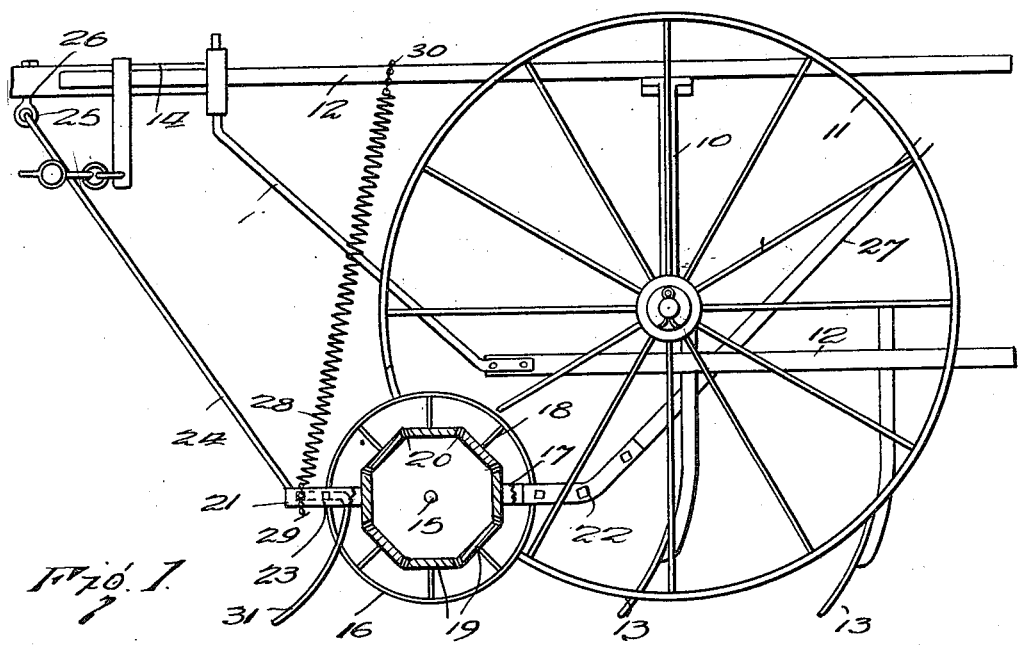

F. W. WOLTER.
PLANTER ATTACHMENT.
APPLICATION FILED SEPT. 28, 1918.

1,322,859.

Patented Nov. 25, 1919.

F. W. Wolter, Inventor

By Geo. P. Kimmel, Attorney

UNITED STATES PATENT OFFICE.

FREDRICH W. WOLTER, OF CUERO, TEXAS.

PLANTER ATTACHMENT.

1,322,859.  Specification of Letters Patent.  Patented Nov. 25, 1919.

Application filed September 28, 1918. Serial No. 256,050.

*To all whom it may concern:*

Be it known that I, FREDRICH W. WOLTER, a citizen of the United States, residing at Cuero, in the county of Dewitt and State of Texas, have invented certain new and useful Improvements in Planter Attachments, of which the following is a specification.

This invention relates to farm machinery, or wheeled implements, and more particularly to an improved planter attachment for cultivators adapted for attachment to cultivators for the purpose of replanting cotton and corn or the like in skips, or where there is a poor stand, the device being operable as the cultivator is advanced across a field over a row of growing plants during the cultivation thereof.

A further object of the invention is to provide a planter attachment for cultivators particularly for planting cotton seed, which is normally raised or inoperative and adapted to be depressed readily for quickly planting seed and which is of a dirigible character, that is capable of being swung to the right or left so that where the planting is being done on a hill-side and the cultivator runs one-sided or where the team is off-side, the device can be shifted so as to plant straight in a row, the device being capable of being quickly lowered to operative position and normally returning to an inoperative position without the necessity of locking the same or presenting the disadvantage of being capable of being moved in a vertical plane only, such as would result in the planting of the seed improperly or not straight in a row.

The invention further comprehends an improved planter attachment for cultivators which comprises a wheeled axle carrying a rotatable box or container having feed openings therein through which the seeds are delivered or discharged, the wheeled frame being carried by a beam having a tongue attached to the draft tongue of the cultivator to permit vertical and lateral or side-wise movement of the device through the medium of a handle located at the rear of the beam or frame and held normally raised by means of springs between the cultivator and said beam, the handle being in position for convenient manipulation or depression by the operator while driving the cultivator and a furrow opener being provided in the front of the seed box or container for opening a furrow into which the seeds are deposited as required, the furrow being closed by the cultivator.

With the above and other objects in view, as will appear as the description proceeds, the invention comprises the various features of construction and arrangement of parts which will be more fully described herein and set forth with particularity in the claims appended hereto.

Reference is had to the accompanying drawings forming a part of this application, in which like reference characters indicate the corresponding parts throughout the several views, in which—

Figure 2:
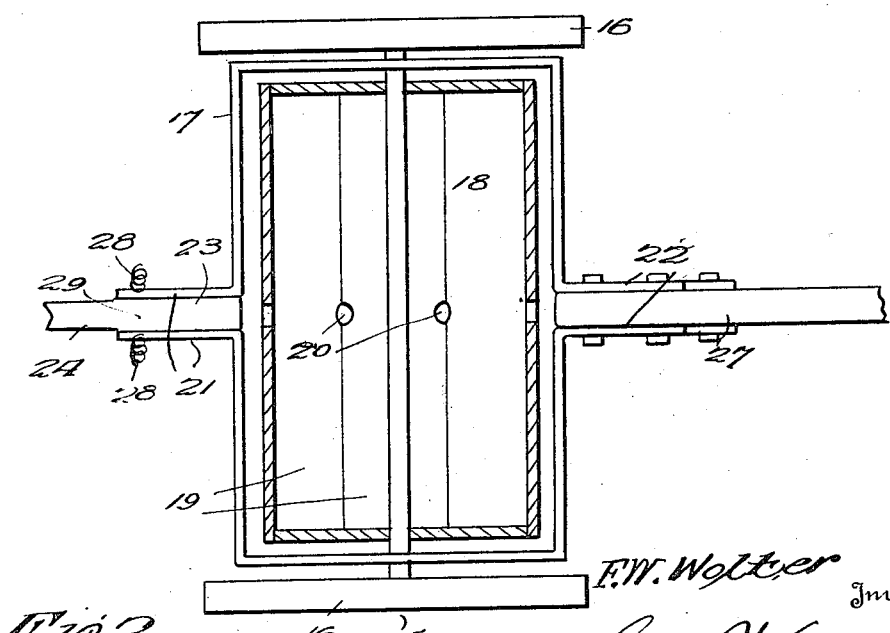

Figure 1 is a side elevation of a cultivator with my improved planter attachment applied thereto and shown in section, and Fig. 2 is a plan view of the attachment enlarged, with portions thereof broken away.

Referring to the drawings in detail, I have shown a wheeled cultivator including an axle 10 on the spindle ends of which transporting wheels 11 are journaled, the frame 12 carrying the usual cultivator plows or shanks 13 designed to straddle a row of growing plants as the cultivator advances across the field, so as to treat the same in the usual manner. The frame has connected thereto, the usual draft tongue or pole 14 for attachment of the draft animals in advancing the machine.

The invention does not comprehend an improved cultivator, but a planter attachment which comprises a wheeled axle 15 upon the ends of which transporting wheels 16 are fixed, said axle carrying a rectangular frame 17 in which said axle is journaled at the opposed sides thereof. Also fixed to the axle 15 is a drum-like box or container 18 preferably octagonal in cross section and formed intermediately between the ends thereof at the juncture of the sides 19 thereof with discharge openings 20 for the seeds, said drum being designed to rotate with the wheels and axle as the device is carried along with the cultivator, when the wheels are depressed in contact with the ground, as will be further explained.

The frame 17 is preferably constructed of metal and has the opposed portions bent in substantially U-shaped form with the extremities 21 and 22 projecting forwardly and rearwardly respectively in spaced parallel relation. To the forward portions 21 is connected a beam 23, the connection being rigid and the beam extending forwardly to provide a pole 24 which extends upwardly toward the draft tongue 14 and is provided with an eye 25 swiveled to an eye bolt 26 carried by the draft tongue and extending vertically through the same, so as to allow vertical as well as lateral swinging movement of the attachment with respect to the cultivator and draft tongue thereof.

Rigidly connected to the portions 22 is a handle 27, said portions 22 extending upwardly and the handle also extending upwardly and rearwardly for convenient operation by the driver of the cultivator, the planter device being located in advance of the cultivator plows and adapted to be raised under the frame while the handle extends beneath the axle and is limited in its upward movement by the frame and the U-shaped portion of the axle. The device is held normally elevated by a pair of coiled contractile springs 28 connected to the frame and beam in any suitable manner, as by chains 29 encircling the beam 23 and frame portions 21, and said springs branch upwardly and outwardly in divergent relation for connection with the cultivator frame at spaced points transversely, as by means of encircling chains 30. In this manner, the springs serve to normally hold the planter off of the ground and above the rows of the growing plants, with the handle 27 projecting above the frame of the cultivator, the device being inoperative, that is the wheels being held out of contact with the ground and the drum or box or container forming the same being held from rotation with the seeds therein. Positioned in front of the container and depending from the beam 23, is a furrow opener or shank 31 designed to produce a furrow in which the seeds are to be planted as required, where the seeds have failed to germinate or where the plants have failed to grow.

In the operation of the device although particularly designed for planting cotton seed, it may be adapted for planting corn or other seed as required, when the cultivator is advanced across the field over a row of growing plants and spaces where replanting is necessary owing to the failure of the seed previously planted, the operator grasps the handle 27 and depresses the same, thereby lowering the wheels 16 in contact with the ground, thus causing rotation of the drum to cause the seed to be discharged through the openings 20 at the required places or intervals. The device is used where replanting is necessary in skips or where there is a poor stand and the cultivating operation is carried on at the same time that the planting operation is effected, the device operating in front of the shovels of the cultivator and opening its own furrow. In view of the fact that the seeds stick together, there is no necessity of providing means to prevent the seeds from falling out when the device is in inoperative position, as it is necessary to give the planter a heavy jar in order to release the seeds, thus requiring that the lower holes or openings 20 be open, especially when it is necessary to replant in a small space, say a skip of two feet, in which instance the planter is pressed to the ground thus giving sufficient jar to discharge or cause the seed to drop out in the furrow produced by the opener in front of the revolving receptacle. Also, by reason of the mounting of the device for lateral or sidewise movement as well as vertical movement, it is to produce the advantages when planting on a hillside and the cultivator is running to one side or when the beam is off-side and unless the device can be drifted laterally to each side, it would not be possible to plant straight in the row as is possible with the device as constructed. The container may be filled in any desired manner and the device modified as required for planting different seeds. Also, as soon as the planting operation is completed, the device is released, when it will automatically be elevated and is out of the way. It is further understood that the illustration of the cultivator is general to illustrate the application of the device and when the planter is released it is limited in its upward movement at the required height, by engagement of the device with the frame of the cultivator at the lower portion thereof, and of the handle 27 with the upper or U-shaped portion of the axle 10.

From the foregoing description taken in connection with the accompanying drawings, it is thought that a clear and comprehensive understanding of the construction, operation, and advantages of my invention may be had, and while I have shown and described the device as embodying a specific structure, I desire that it be understood that such changes may be made in said structure as do not depart from the spirit and scope of the invention as claimed.

Having thus fully described my invention what I claim as new, and desire to secure by Letters Patent, is:

1. The combination with a cultivator, of a planter suspended beneath the same and adapted for vertical and lateral movement, means connected with the cultivator and the planter for positioning the latter midway of the cultivator frame, and a rigid handle at the rear of the planter for swinging the same vertically or laterally with respect to the cultivator.

2. The combination with a cultivator; of a planter supported beneath the same in advance of the ground working elements and adapted for vertical and lateral movement, means for normally holding the planter elevated to pass over a row of growing plants being cultivated and means for depressing the planter and guiding the same in the row, and resilient means connected to the planter and said cultivator.

3. The combination with a wheel cultivator, of a planter having a furrow opener, means movably suspending the planter from the cultivator to permit vertical movement and also lateral movement, resilient means connected to the planter and cultivator and a handle at the rear of the planter and adapted to be depressed by the operator of the cultivator for disposing the planter in operative position.

In testimony whereof, I affix my signature hereto.

FREDRICH W. WOLTER.